(No Model.) 2 Sheets—Sheet 1.
W. MITCHELL.
SMOOTHING IRON.
No. 596,460. Patented Dec. 28, 1897.
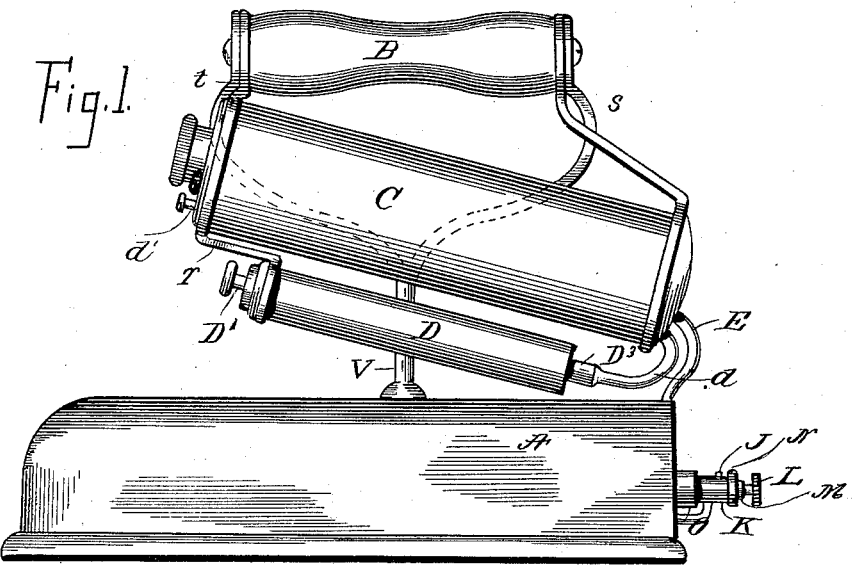
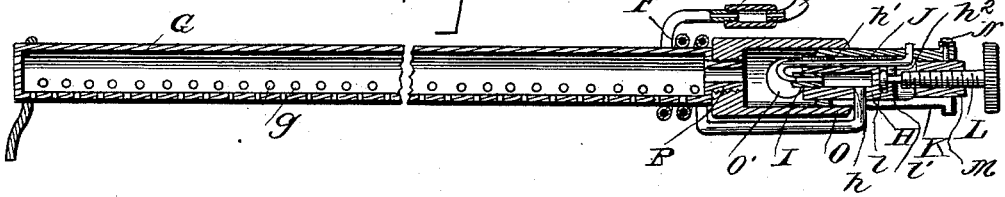
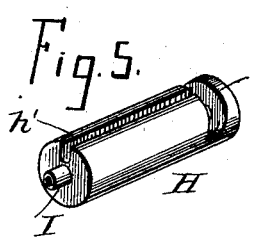
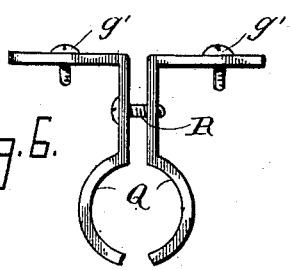
Witnesses
Guy A. Crnand
T. W. Johnson
Inventor
Willis Mitchell
by
Wm H Babcock
Attorney
THE NORRIS PETERS CO., PHOTO-LITHO., WASHINGTON, D. C.

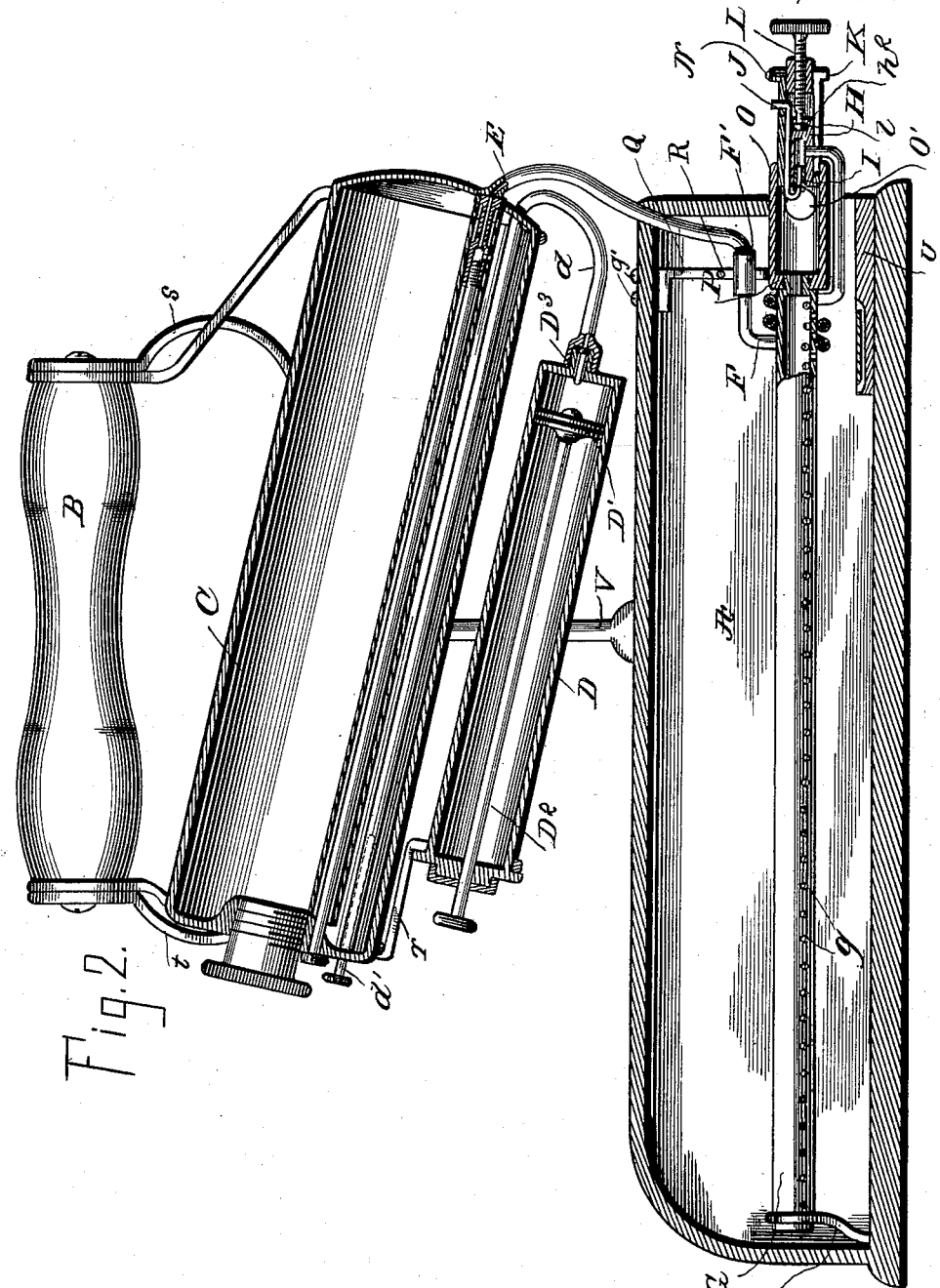

UNITED STATES PATENT OFFICE.

WILLIS MITCHELL, OF MALDEN, MASSACHUSETTS.

SMOOTHING-IRON.

SPECIFICATION forming part of Letters Patent No. 596,460, dated December 28, 1897.

Application filed January 19, 1897. Serial No. 619,703. (No model.)

*To all whom it may concern:*

Be it known that I, WILLIS MITCHELL, a citizen of the United States, residing at Malden, in the county of Middlesex and State of Massachusetts, have invented certain new and useful Improvements in Smoothing-Irons; and I do hereby declare the following to be a full, clear, and exact description of the invention, such as will enable others skilled in the art to which it appertains to make and use the same.

The object of this invention is to provide convenient means for heating smoothing-irons and other calorific utensils or implements by means of gasolene or similar vaporous fluid derived from a receptacle and forced by an air-pump to the jet-block, all of the aforesaid parts being attached to and portable with the implement; also, to make the heating action automatic in its regulation, and to secure the highest degree of efficiency by simple means. To this end I have made use of a tubular perforated burner having a fine gasolene-pipe wound thereon, in combination with a reservoir which supplies the said pipe, means for forcing the gasolene out of the said reservoir into the said pipe, a jet-block supplied by the reservoir and discharging into the said burner, and a receptacle which is placed below the jet-block to collect the first drops of gasolene that they may be ignited and start the work of vaporization, which thereafter continues and is regulated automatically.

In the accompanying drawings, Figure 1 represents a side elevation of a large-size smoothing-iron such as pressing-machines operate. Fig. 2 represents a vertical longitudinal central section of the same. Fig. 3 represents a detail view, in longitudinal vertical section, of the burner, jet-block, and divers proximate parts. Fig. 4 represents a detail perspective view of the jet-block-regulating hook. Fig. 5 represents a similar view of the jet-block. Fig. 6 represents a detail sectional view of the supporting clamp or bracket for the outer end of the burner.

A designates the hollow body of the iron; B, the wooden handle, rigid therewith; C, the hollow gasolene-reservoir; D, the air-pump, communicating therewith by an air-pipe $d$, which is controlled by a screw-plug $d'$, covering or uncovering an opening at will; E, a gasolene-outlet pipe from the said reservoir, which is governed in like manner by a long screw-plug or screw-threaded rod opening and closing an aperture in the said pipe E, and F a fine coiled pipe which is detachably connected to pipe E by coupling F' within the said iron body A. This pipe F is wound helically about a hollow elongated burner G, the coils beginning at the receiving end and extending for a part of its length, leaving the remainder of the burner unwound. The helical winding may of course be double, treble, or quadruple for better effect, although for simplicity of illustration only a single winding or layer of coils has been shown. The said tube F discharges into the interior of the said jet-block through an opening $h$. The inner end of this hollow interior is open and has a fine jet tube or nozzle I fitted therein, through which the jet of vapor issues when the said jet-block is sufficiently withdrawn to allow such escape. The device for closing this nozzle is a fixed hook J, attached to an inclosing casing K and fitting into a longitudinal groove $h'$ of the said jet-block, so as to allow the latter to be moved backward and forward without impediment by means of an adjusting-screw L, that engages the outer end of said jet-block by means of its head $l$ and neck $l'$, engaging the recessed outer part $h^2$ of the said jet-block. This screw works through a nut or internally-screw-threaded clamping-sleeve M, which fits within the outer end of the said casing and is held in place by a clamping-screw N. The said casing is tubular in form and longitudinally slotted to allow the forward-and-backward movement of the jet-block without being locked by the pipe F, and its inner end fits tightly into the outer end of a coupling-sleeve O, the other end of which has the reduced outer end P of the aforesaid burner screwed into it. This reduction of the receiving end of the burner somewhat impedes the flow of the gasolene-vapor into the said burner, so that it will be less likely to rush past any aperture $g$ without igniting or beyond the coils of the wire F without heating the same.

An opening O' in the side of the coupling-sleeve O admits air and also permits access to the jet-block without displacing the parts.

The burner is provided at its inner end with a fixed leg G', on which it rests. A pair of plates Q are fastened by screws q' q' to the top of body A, curved at their lower ends to fit the exterior of the sleeve O and drawn together thereon by a transverse screw R, so as to constitute a supporting clamp or bracket for the outer end of the burner and the jet-block. When the adjusting-screw L moves the jet-block to its innermost position, the reversely-presented point of the hook J enters and closes the end of the fine tube or nozzle I. When the said adjusting-screw draws back the jet-block, the end of the said block leaves the stationary point of the hook more or less, and a jet of gasolene or vapor will issue if the screw-plugs or valve-rods of the air-pipe and gasolene-pipe have been opened, as above stated.

The air-pump D is provided with the usual piston D' and piston-rod $D^2$, as well as a check-valve $D^3$. It is shown as arranged outside of and below the reservoir C and rigidly connected thereto by an arm r, said reservoir being likewise rigidly connected to the handle B by arms s and t and supported from the body A by a rigid leg or bar v.

Under the burner and jet-block is placed a shallow receptacle U, having an inclined upper face which directs any dripping of liquid gasolene to an absorbent pad of asbestos carried thereby.

The operation is as follows: The air-tube, gasolene-tube, and jet tube or nozzle being opened, as before described, the air-pump is worked, and the liquid gasolene issues from the opening O' in sleeve O and falls drop by drop on the said receptacle, passing into the said pad. Here it is lighted and at once heats the gasolene in the helical pipe F, so as to vaporize it to some extent and cause a corresponding pressure. The vaporized gasolene issuing from the jet tube or nozzle into the burner will become ignited by the flame at the perforations g, which will raise the temperature of the coils of pipe F to a high point and also amply heat the body of the smoothing-iron. When the temperature becomes too high and the pressure too great, the vaporized gasolene rushes through from the jet-block to a point beyond the coiled pipe, or a considerable part thereof, without igniting. As a result the temperature of the gasolene in the coil somewhat falls, the pressure correspondingly decreases, the movement of the vapor at the receiving end of the burner becomes slower, ignition takes place at the outer holes g, and the temperature rises again. The practical effect is to automatically regulate the heat, so as to keep it at the point desired. This is important, for if the heat be too great and the forward flow of the vapor obstructed by excessive length of wire tubing or in any other way the back pressure will be likely to cause an explosion in the gasolene-reservoir or do other serious damage.

Considerable experiment has been necessary to determine the proper proportions, temperature, and arrangements. A fine pipe is necessary to give satisfactory results in the coils or helices about the cylindrical burner, for a large pipe would be more difficult to heat and more expensive in operation. I use a pipe having an inner diameter of about one twenty-fourth of an inch, more or less, the same being wound as hereinbefore described. As a result the gasolene is so rarefied that it cannot be seen as it comes through the tube or nozzle. While thus issuing from other jet-tubes it appears as a fine spray. Of course these devices may be used to heat other implements and articles beside smoothing-irons and with smoothing-irons of the ordinary hand-operated kind as well as those operated by machinery.

Having thus described my invention, what I claim as new, and desire to secure by Letters Patent, is—

1. A burner having the form of a tube or elongated cylinder and provided with perforations in longitudinal series and with an inlet at one end, in combination with a pipe for supplying inflammable fluid and means for discharging the said fluid in a state of ignition into the said burner through the said inlet, the said pipe being wound on the said burner at the inlet end for only a part of the length of the series of perforations to provide for automatic regulation of temperature substantially as set forth.

2. In combination with the hollow body of a smoothing-iron a burner within the same, a gasolene-coil wound on the said burner, a jet-block supplied by the said coil and discharging into the said burner, a fixed hook or point arranged to close partly or wholly the discharge-opening of the said jet-block, means for adjusting the said jet-block toward or from the said hook, a casing which incloses and guides the said jet-block and a coupling which connects the said casing to the said burner substantially as set forth.

3. A gasolene-supply coil approximately one twenty-fourth of an inch in internal diameter, in combination with a hollow elongated burner having a longitudinal series of perforations, the said coil supplying the said burner at one end of the latter and being wound on the said burner at the inlet end for a part of the length of the said series of perforations, substantially as and for the purpose set forth.

In testimony whereof I affix my signature in presence of two witnesses.

WILLIS MITCHELL.

Witnesses:
M. L. SMITH,
H. W. PERKINS.